US012730233B2

(12) United States Patent
Ueno et al.

(10) Patent No.: US 12,730,233 B2
(45) Date of Patent: Sep. 8, 2026

(54) RADIATION IMAGING APPARATUS AND RADIATION IMAGING SYSTEM

(71) Applicant: CANON KABUSHIKI KAISHA, Tokyo (JP)

(72) Inventors: Hiroto Ueno, Kanagawa (JP); Hideaki Morita, Tokyo (JP); Yoshiaki Serizawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 18/615,906

(22) Filed: Mar. 25, 2024

(65) Prior Publication Data

US 2024/0329261 A1 Oct. 3, 2024

(30) Foreign Application Priority Data

Mar. 28, 2023 (JP) ................................ 2023-051694

(51) Int. Cl.
*G01T 1/175* (2006.01)
*G01T 1/36* (2006.01)

(52) U.S. Cl.
CPC ............. *G01T 1/175* (2013.01); *G01T 1/361* (2013.01)

(58) Field of Classification Search
CPC ................................ G01T 1/175; G01T 1/361
See application file for complete search history.

(56) References Cited

U.S. PATENT DOCUMENTS

| | | | | |
|---|---|---|---|---|
| 9,462,207 | B2 * | 10/2016 | Raynor | H03M 1/002 |
| 2013/0121471 | A1 * | 5/2013 | Takahashi | H05G 1/30 378/91 |
| 2015/0281610 | A1 * | 10/2015 | Ota | H10F 39/18 257/292 |
| 2020/0106970 | A1 * | 4/2020 | Tamura | G01T 1/17 |

FOREIGN PATENT DOCUMENTS

| | | | | |
|---|---|---|---|---|
| JP | 2006208308 | A * | 8/2006 | H04N 23/651 |
| JP | 2010147934 | A * | 7/2010 | H04N 25/709 |
| JP | 2018157939 | A * | 10/2018 | G01N 23/04 |

* cited by examiner

*Primary Examiner* — Uzma Alam
*Assistant Examiner* — Fani Polyzos Boosalis
(74) *Attorney, Agent, or Firm* — Canon U.S.A., Inc. IP Division

(57) ABSTRACT

A radiation imaging apparatus includes a pixel configured to generate a charge based on radiation, a readout circuit that reads out the charge from the pixel, a drive unit that drives the readout circuit, and an image processing unit that reads out the charge from the readout circuit and generates an image, and performs first control to supply power to the drive unit and the image processing unit and second control to supply power to the drive unit and not to the image processing unit.

7 Claims, 5 Drawing Sheets

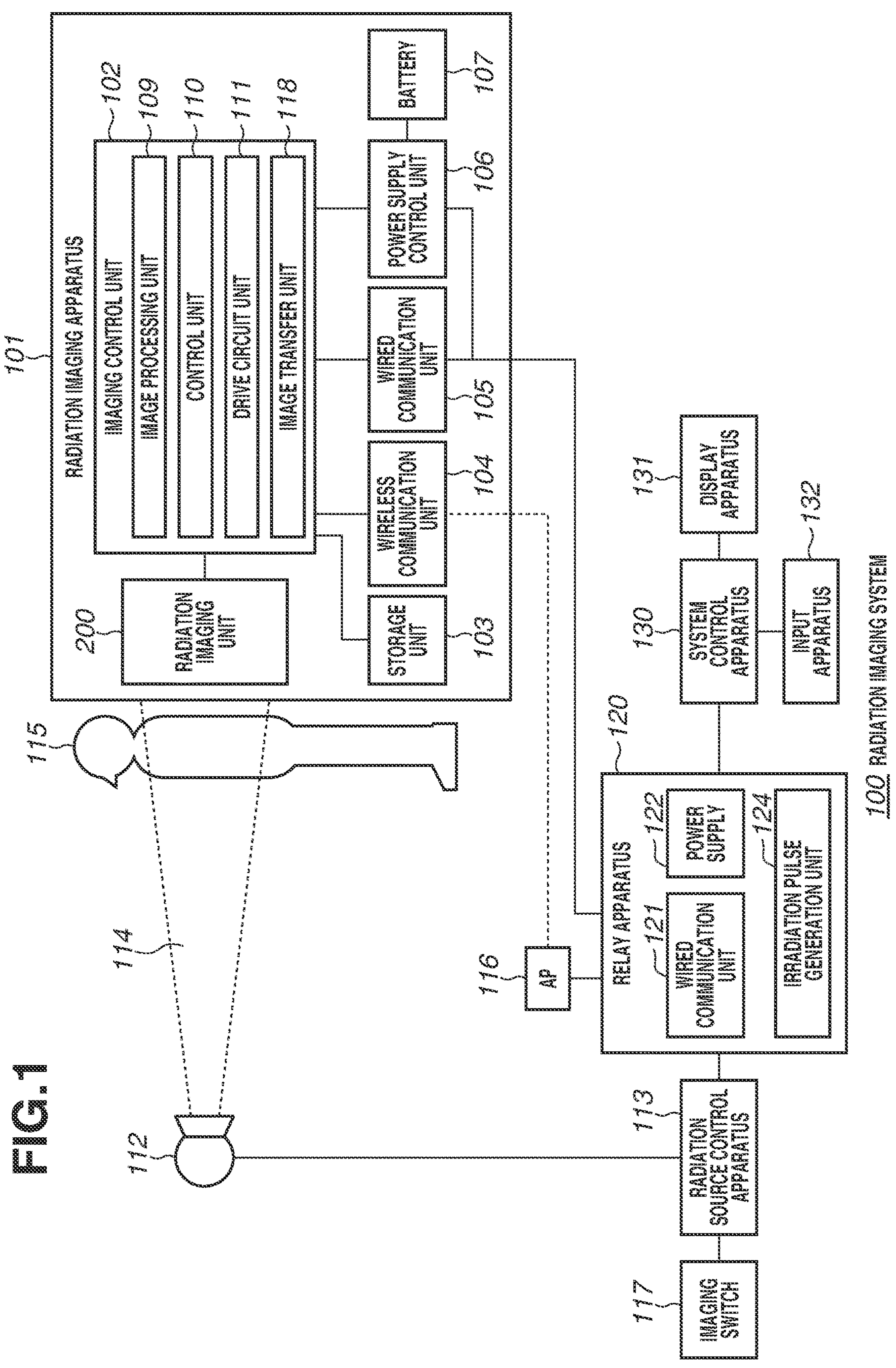
FIG.1
RADIATION IMAGING APPARATUS
IMAGING CONTROL UNIT
IMAGE PROCESSING UNIT
CONTROL UNIT
DRIVE CIRCUIT UNIT
IMAGE TRANSFER UNIT
BATTERY
POWER SUPPLY CONTROL UNIT
WIRED COMMUNICATION UNIT
WIRELESS COMMUNICATION UNIT
STORAGE UNIT
RADIATION IMAGING UNIT
DISPLAY APPARATUS
SYSTEM CONTROL APPARATUS
INPUT APPARATUS
RELAY APPARATUS
POWER SUPPLY
WIRED COMMUNICATION UNIT
IRRADIATION PULSE GENERATION UNIT
AP
RADIATION SOURCE CONTROL APPARATUS
IMAGING SWITCH
100 RADIATION IMAGING SYSTEM
101
102
109
110
111
118
107
106
105
104
103
200
115
114
112
113
116
117
120
121
122
124
130
131
132

102
IMAGING CONTROL UNIT
200
213
SENSOR READOUT CIRCUIT
A/D CONVERTER
206
205
AMPLIFIER
204
MULTIPLEXER
203b
SAMPLE-AND-HOLD CIRCUIT
203a
AMPLIFICATION CIRCUIT
POWER SUPPLY
201
SENSOR SCANNING CIRCUIT
SENSOR ARRAY
202
211
DRIVE LINE
207
PIXEL
208
SWITCH ELEMENT
209
CONVERSION ELEMENT
210
SIGNAL LINE

PRESSING IMAGING SWITCH
OPERATING STATE
DUMMY READ
ACCUMULATION
READOUT
DUMMY READ
RADIATION IRRADIATION
CONTROL UNIT
ON
IMAGE PROCESSING UNIT
OFF
ON
OFF
DRIVE CIRCUIT UNIT
ON

RADIATION IMAGING APPARATUS AND RADIATION IMAGING SYSTEM

BACKGROUND OF THE DISCLOSURE

Field of the Disclosure

The present disclosure relates to a radiation imaging apparatus and a radiation imaging system.

Description of the Related Art

Radiation imaging apparatuses equipped with flat panel detectors (FPDs) made of semiconductor materials have become widespread as radiation imaging apparatuses used for medical image diagnosis and non-destructive testing using radiation such as X-rays. In medical image diagnosis, for example, such radiation imaging apparatuses are used as digital radiation imaging apparatuses that capture still images such as general imaging and moving images such as fluoroscopic imaging.

Among radiation imaging apparatuses, a radiation imaging apparatus for a doctor's round of visit is used to image a patient who has difficulty moving to an X-ray imaging room. In such a radiation imaging apparatus, an FPD is configured to be supplied with power from a built-in power supply such as a battery.

Thus, if the power runs out quickly due to a usage condition or the like, the battery must be charged many times a day, which is inconvenient. In addition, if the power runs out during imaging, it will be necessary to perform imaging again, which may increase a radiation exposure dose of an object and place a burden on a patient. Thus, there is a need for an FPD with low power consumption and long battery life.

For such a radiation imaging apparatus, an FPD is discussed, as in Japanese Patent Application Laid-Open No. 2006-208308, that reduces power consumption by omitting power supply to an unnecessary member during standby of imaging.

According to a technique discussed in Japanese Patent Application Laid-Open No. 2006-208308, power consumption is reduced by not applying voltage to a readout circuit during a standby mode, but further improvement is needed.

SUMMARY OF THE DISCLOSURE

According to an aspect of the present disclosure, a radiation imaging apparatus includes a pixel configured to generate a charge based on radiation, a readout circuit configured to read out the charge from the pixel, a drive unit configured to drive the readout circuit, an image processing unit configured to read out the charge from the readout circuit and generate an image based on the charge, a power supply unit configured to supply power to the drive unit and the image processing unit, and a control unit configured to control the drive unit, the image processing unit, and the power supply unit. The control unit performs first control to cause the power supply unit to supply power to the drive unit and the image processing unit and second control to cause the power supply unit to supply power to the drive unit and not to supply power to the image processing unit.

Further features of the present disclosure will become apparent from the following description of exemplary embodiments with reference to the attached drawings.

BRIEF DESCRIPTION OF THE DRAWINGS

FIG. 1 illustrates an example of a schematic configuration of a radiation imaging system according to a first exemplary embodiment.

DESCRIPTION OF THE EMBODIMENTS

Figure 2:
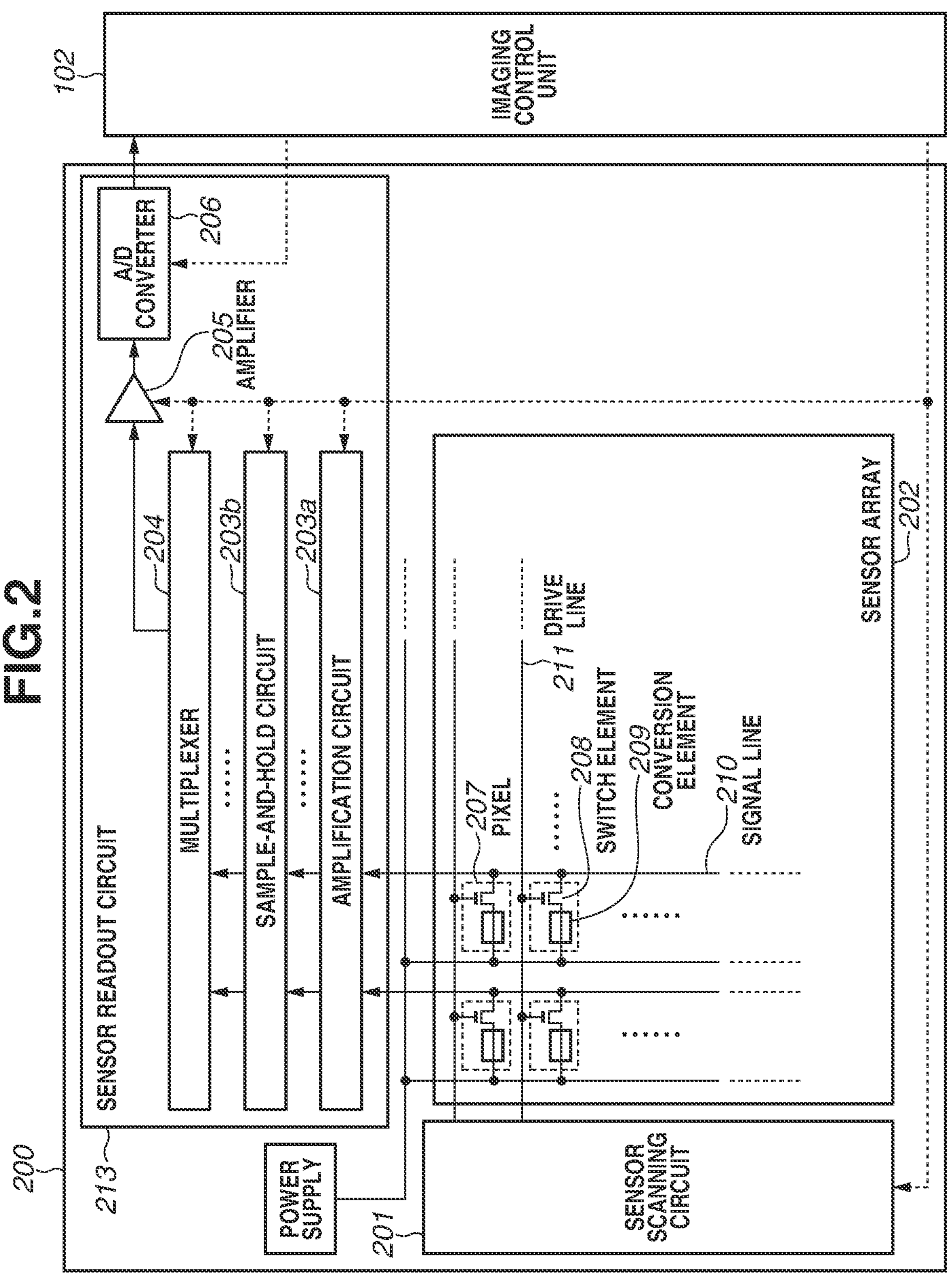
FIG. 2 illustrates an example of a schematic configuration of a radiation imaging unit according to the first exemplary embodiment.

Exemplary embodiments for implementation of the present disclosure will be described below with reference to the accompanying drawings. In the present specification, it is desirable to use X-rays as radiation according to the present disclosure, but the radiation is not limited to the X-rays and includes a-rays, B-rays, and y-rays.

A first exemplary embodiment of the present disclosure will be described below. FIG. 1 illustrates an example of a schematic configuration of a radiation imaging system 100 according to the first exemplary embodiment. As illustrated in FIG. 1, the radiation imaging system 100 includes a radiation imaging apparatus 101, a radiation source 112, a radiation source control apparatus 113, a wireless access point (AP) 116, a relay apparatus 120, and a system control apparatus 130. The AP 116 may be integrated with the relay apparatus 120 or may be excluded if wireless communication is not used. While not illustrated, the radiation imaging system 100 is connectable to a radiology information system (RIS), a picture archiving and communication system (PACS) that is a medical image management system, a printer, and the like.

The radiation imaging apparatus 101 is communicable with the relay apparatus 120 that is an external apparatus. Specifically, the radiation imaging apparatus 101 is able to perform wired communication with the relay apparatus 120, which is the external apparatus. A housing of the radiation imaging apparatus 101 has an external connection terminal (not illustrated) to which a connection terminal of a wired cable is connected. The radiation imaging apparatus 101 is able to perform wireless communication with the relay apparatus 120, which is the external apparatus, via the AP 116. As illustrated in FIG. 1, the radiation imaging apparatus 101 includes a radiation imaging unit 200, an imaging control unit 102, a storage unit 103, a wireless communication unit 104, a wired communication unit 105, a power supply control unit 106, and a battery 107, which is a power supply unit. If only wired communication is used, the wireless communication unit 104 may be excluded, and if power is externally suppliable via a wire, the battery 107 may be excluded.

The radiation imaging unit 200 detects radiation 114 (including radiation having passed through an object 115) emitted from the radiation source 112 and acquires image data that becomes a radiation image of the object 115. It is desirable to use, for example, a flat panel detector as the radiation imaging unit 200.

The imaging control unit 102 performs various types of control related to radiation imaging by the radiation imaging apparatus 101.

The imaging control unit 102 includes a drive circuit unit 111 that is a drive unit configured to control drive of the radiation imaging unit 200, and an image processing unit 109 that acquires image data from the radiation imaging unit 200 and performs various types of image processing. Further, the imaging control unit 102 includes a control unit 110 that controls the drive circuit unit 111 and the image processing unit 109. The imaging control unit 102 also includes an image transfer unit 118 that controls storage of image data in the storage unit 103 and controls transfer of the image data to the relay apparatus 120 via the wireless communication unit 104 and the wired communication unit 105. Specifically, the control unit 110 instructs the drive circuit unit 111 about a drive start timing and sets a drive condition thereto. The control unit 110 instructs the image processing unit 109 about an image acquisition timing and performs power supply control thereon. The image processing unit 109 can have functions of image processing including correction processing for correcting acquired image data (defect, offset, and/or gain), processing for reducing various noises, and gradation processing.

Part or all of the functions of the image processing unit 109 in the radiation imaging apparatus 101 is includable in the radiation source control apparatus 113 and the system control apparatus 130, which are described below, depending on a required system configuration. The image transfer unit 118 controls storage and transfer of acquired image data.

The storage unit 103 stores a program for controlling an operation of the radiation imaging apparatus 101 and various types of information and data to be used for the control. The storage unit 103 stores, for example, various types of information and data acquired through processing by the imaging control unit 102. For example, the storage unit 103 stores image data acquired by the imaging control unit 102 and image data having been subjected to correction under control of the imaging control unit 102.

The wireless communication unit 104 performs wireless communication with the relay apparatus 120 via the AP 116 using, for example, a wireless local area network (LAN). The wired communication unit 105 performs wired communication with the relay apparatus 120 by wire (cable). The imaging control unit 102 uses either or both of the wireless communication unit 104 and the wired communication unit 105 to perform, for example, command communication, radiation synchronous control communication, image data communication, and the like with the relay apparatus 120. The wired communication between the radiation imaging apparatus 101 and the relay apparatus 120 is also performable using, for example, Ethernet. In the wireless communication between the radiation imaging apparatus 101 and the relay apparatus 120 in FIG. 1, the wireless communication via the AP 116 is illustrated, but the radiation imaging apparatus 101 or the relay apparatus 120 may serve as an access point and directly perform wireless communication. In the wireless communication, communication technologies, such as those based on Wireless Fidelity (Wi-Fi) and Bluetooth®, are usable. The radiation imaging apparatus 101 and the system control apparatus 130 establish wireless communication with connection destinations that are set as respective connection destinations in advance.

The power supply control unit 106 controls a power supply that supplies power to each component of the radiation imaging apparatus 101, such as the radiation imaging unit 200 and the imaging control unit 102, under control of the imaging control unit 102.

The battery 107 is the power supply (power supply unit) provided inside the radiation imaging apparatus 101. For example, if the wired communication is not disconnected (the wired communication is established (connected)), the power supply control unit 106 supplies power to each component of the radiation imaging apparatus 101 using a power supply 122 of the relay apparatus 120, which is the external apparatus, and controls each component to operate. If the wired communication is disconnected, the power supply control unit 106 supplies power to each component of the radiation imaging apparatus 101 using the battery 107 provided inside the radiation imaging apparatus 101 and controls each component to operate. According to the present exemplary embodiment, the battery 107 is provided inside the radiation imaging apparatus 101, but may be configured, for example, as a battery that is attachable to and detachable from the radiation imaging apparatus 101. The battery 107 according to the present exemplary embodiment is configured to be charged by receiving power from an external source. It is also possible to use, for example, a secondary battery, such as a lithium-ion battery and a nickel hydride battery, and a power storage device, such as a lithium-ion capacitor and an electric double layer capacitor.

The radiation source 112 is an apparatus that generates the radiation 114, such as X-rays. The radiation source 112 includes, for example, an electron gun and a rotor. In this case, electrons collide with the rotor while being accelerated by high voltage generated by the radiation source control apparatus 113, so that the radiation 114 is generated.

The system control apparatus 130 comprehensively controls the operation of the radiation imaging system 100. The system control apparatus 130 performs various types of control, such as the operation of the radiation imaging system 100, acquisition, input, and setting of an imaging protocol, and data processing of a radiation image captured by the radiation imaging apparatus 101. The system control apparatus 130 has an application function that operates on a computer. In other words, the system control apparatus 130 includes one or more processors and memories, and the processor executes a program stored in the memory to realize each functional unit described below. Part or all of each functional unit may be realized by dedicated hardware. The system control apparatus 130 is able to suitably use, for example, various computers and workstations. The system control apparatus 130 is connected to a display apparatus 131 that displays information about a control menu, a captured radiation image, and the like and an input apparatus 132, such as a mouse and a keyboard, for performing various inputs. The system control apparatus 130 outputs an image to the display apparatus 131 and provides a graphical user interface using the display apparatus 131 while controlling the operation of the radiation imaging apparatus 101. An example is described in which the system control apparatus 130, the display apparatus 131, and the input apparatus 132 are separate apparatuses, but they may also be a portable information device terminal, such as a notebook personal computer (PC) and a tablet.

The relay apparatus 120 functions as an interface apparatus that is connected to the radiation imaging apparatus 101, the system control apparatus 130, and the radiation source control apparatus 113. The relay apparatus 120 is connected to the system control apparatus 130 via Ethernet or the like and also functions as a relay apparatus that transfers image data acquired by the radiation imaging apparatus 101 to the system control apparatus 130. The relay apparatus 120 includes a wired communication unit 121 that performs wired communication with the radiation imaging apparatus 101, the power supply 122 that is capable of supplying power to the radiation imaging apparatus 101, and an irradiation pulse generation unit 124 that issues an irradiation request to the radiation source control apparatus 113. The relay apparatus 120 performs synchronous communication with the radiation imaging apparatus 101 and the radiation source control apparatus 113 and controls notification of information about an imaging request switch and synchronization of an image acquisition timing with a radiation irradiation timing of the radiation source control apparatus 113.

The radiation source control apparatus 113 controls the radiation 114 to be generated from the radiation source 112. The radiation source control apparatus 113 is connected to, for example, an imaging switch 117 and issues a request for radiation irradiation if the imaging switch 117 is pressed. The radiation source control apparatus 113 may be connected to an operation unit that sets a radiation irradiation condition and the like.

For example, if the imaging switch 117 is pressed, radiation irradiation is performed under the irradiation condition for capturing one frame of radiation image. The imaging switch 117 is not necessarily a dedicated switch and may be, for example, a button on a user interface provided on the radiation source control apparatus 113. The imaging switch 117 may be a switch that is operable in two different operational modes, specifically, a preparation switch for notifying the radiation source control apparatus 113 and the radiation imaging apparatus 101 of imaging preparation in advance and a request switch for issuing an actual imaging request.

Next, internal configurations of the imaging control unit 102 and the radiation imaging unit 200 illustrated in FIG. 1 are described with reference to FIG. 2. FIG. 2 illustrates an example of the internal configuration of the radiation imaging unit 200 illustrated in FIG. 1. As illustrated in FIG. 2, the radiation imaging unit 200 includes a sensor scanning circuit 201, a sensor array 202, an amplification circuit 203*a*, a sample-and-hold circuit 203*b*, a multiplexer 204, an amplifier 205, and an analog-to-digital (A/D) converter 206. A sensor readout circuit 213 includes the amplification circuit 203*a*, the sample-and-hold circuit 203*b*, the multiplexer 204, the amplifier 205, and the A/D converter 206. Thus, the radiation imaging unit 200 can capture one frame of radiation image by driving a plurality of pixels 207 based on signals accumulated in the plurality of pixels 207 that are arranged in a matrix and can generate charges based on radiation.

The sensor scanning circuit 201 drives the plurality of pixels 207 provided in the sensor array 202 under control of the imaging control unit 102.

The sensor array 202 includes the plurality of pixels 207 arranged in the matrix.

More specifically, the plurality of pixels 207 is arranged in a two-dimensional array to form a plurality of rows and a plurality of columns in the sensor array 202. One pixel 207 includes a conversion element 209 that converts the incident radiation 114 into a signal charge (an electrical signal) and a switch element 208, such as a thin film transistor (TFT), that transfers the electrical signal to the outside. According to the present exemplary embodiment, the conversion element 209 includes a scintillator (phosphor) that converts the incident radiation 114 into visible light or other light and a photoelectric conversion element that converts the light converted by the scintillator into a signal charge. The present disclosure is not limited to this form, and it is also possible to use a direct conversion type conversion element that directly converts the incident radiation 114 into a signal without providing a scintillator as the conversion element 209.

The sensor scanning circuit 201 switches ON and OFF of the switch element 208 via a drive line 211 to perform charge accumulation and charge readout of the conversion element 209, and as a result, a radiation image can be acquired. More specifically, the sensor scanning circuit 201 applies an ON voltage of the switch element 208 to a predetermined drive line 211, and thus the switch element 208 of each pixel 207 in a row connected to the predetermined drive line 211 is turned ON. A charge in the conversion element 209 is amplified by the amplification circuit 203*a* via each signal line 210 and held in the sample-and-hold circuit 203*b*. Subsequently, the signal held in the sample-and-hold circuit 203*b* is sequentially read out via the multiplexer 204, amplified by the amplifier 205, and then converted into digital radiation image data by the A/D converter 206.

The sensor scanning circuit 201 applies an OFF voltage of the switch element 208 to the predetermined drive line 211, and thus each pixel 207 in the row for which charge readout is completed returns to a charge accumulation state. As described above, the sensor scanning circuit 201 sequentially drives the pixel 207 in each row of the sensor array 202 to scan, and finally the signal charges of all the pixels 207 are converted into digital values. Thus, the image data can be read out. Control of driving, readout operation, and the like of the radiation imaging unit 200 is performed by the imaging control unit 102 illustrated in FIG. 1.

The imaging control unit 102 sets an operating state of the radiation imaging unit 200 based on an imaging order and imaging mode information set by the system control apparatus 130 as well as a connection state of the wired cable and performs control to drive the radiation imaging unit 200. In a case where an imaging request signal is received from the relay apparatus 120, the imaging control unit 102 is able to perform an imaging operation for a moving image and a still image while synchronizing with the relay apparatus 120. The imaging control unit 102 performs necessary image processing on the image data acquired through the imaging operation, and then controls storage of the image data in the storage unit 103 and transfer to an external apparatus. More specifically, the image data is transferred from the radiation imaging apparatus 101 to the system control apparatus 130 via the relay apparatus 120.

Each of the pixels 207 in the sensor array 202 has different characteristics. Main characteristic variations include variations in offset (dark current) and gain (conversion efficiency). The image processing unit 109 performs offset correction on the image data to remove dark current components of the conversion element 209 which occur irrespective of radiation irradiation. The dark current components used in the offset correction are acquired, for example, by accumulating electric charges without emitting radiation for the same time as an electric charge accumulation time when image information for the object 115 is acquired immediately after acquisition of image data including the image information of the object 115. The image data acquired at this time is hereinbelow referred to as offset data. The offset correction is performed by subtracting the offset data from the image data (raw data) before correction.

The dark current components in the conversion element 209 accumulates even in a period during which imaging is not performed, so that dummy read drive is continued to remove the dark current during an imaging standby period. In the dummy read drive, the sensor scanning circuit 201 applies the ON voltage of the switch element 208 to the predetermined drive line 211. Thus, the switch element 208 of each pixel 207 in the row connected to the predetermined drive line 211 is turned ON, and the charge (dark current component) in the conversion element 209 is discharged via each signal line 210, read out, and discarded.

Next, the image processing unit 109 performs gain correction on the image data having been subjected to the offset correction to correct a variation in the conversion efficiency among pixels. The image data to be used in the gain correction can be acquired by emitting radiation without arranging the object 115. The image data acquired at this time is hereinbelow referred to as gain data. The offset data and the gain data are used as image correction data, and can be used for display and various types of processing as an image or a map, respectively.

The gain correction is performed by dividing the image data having been subjected to the offset correction by the gain data and then multiplying it by an appropriate coefficient, such as an average value of entire gain data.

Since acquisition of the gain data involves radiation irradiation, it is difficult to acquire the gain data at a time of acquisition of a radiation image of the object 115. Thus, the gain data is acquired, for example, once a day or once a week.

Normally, it is very rare that radiation imaging is performed continuously while the radiation imaging apparatus 101 is powered on. Thus, most of the period during which the radiation imaging apparatus 101 is powered on is in an imaging standby state in which radiation imaging is not performed. Thus, a main factor that causes the radiation imaging apparatus 101 to consume the battery (power supply unit) 107 is the power to maintain the imaging standby state, so that reducing the power consumption in the imaging standby state greatly improves a lifetime of the battery (power supply unit) 107. In other words, it is possible to reduce the power consumption by limiting the power supply not only to the readout circuit as in Japanese Patent Application Laid-Open No. 2006-208308, but also to a unit that controls an operation of the readout circuit and a unit that processes a signal acquired from the readout circuit.

In the imaging standby state, imaging is not performed, so that power is not to be supplied to the image processing unit 109 which consumes a large power. Thus, the power supply to the image processing unit 109 is turned OFF under the control of the control unit 110 during the imaging standby. In general, the power consumption of the image processing unit 109 is larger than the power consumption of the drive circuit unit 111, so that an effect of reducing the power consumption by not supplying (turning off) power to the image processing unit 109 is significant.

The image processing unit 109, the control unit 110, and the drive circuit unit 111 that configure the imaging control unit 102 may be formed in one chip, and only the image processing unit 109 may be partially powered off within the chip.

The image processing unit 109, the control unit 110, and the drive circuit unit 111 may be configured on separate chips, and the control unit 110 and the drive circuit unit 111 that are to be continuously supplied with power during the imaging standby may be configured with a power saving device such as a complex programmable logic device (CPLD) which consumes a low power.

Figure 3:
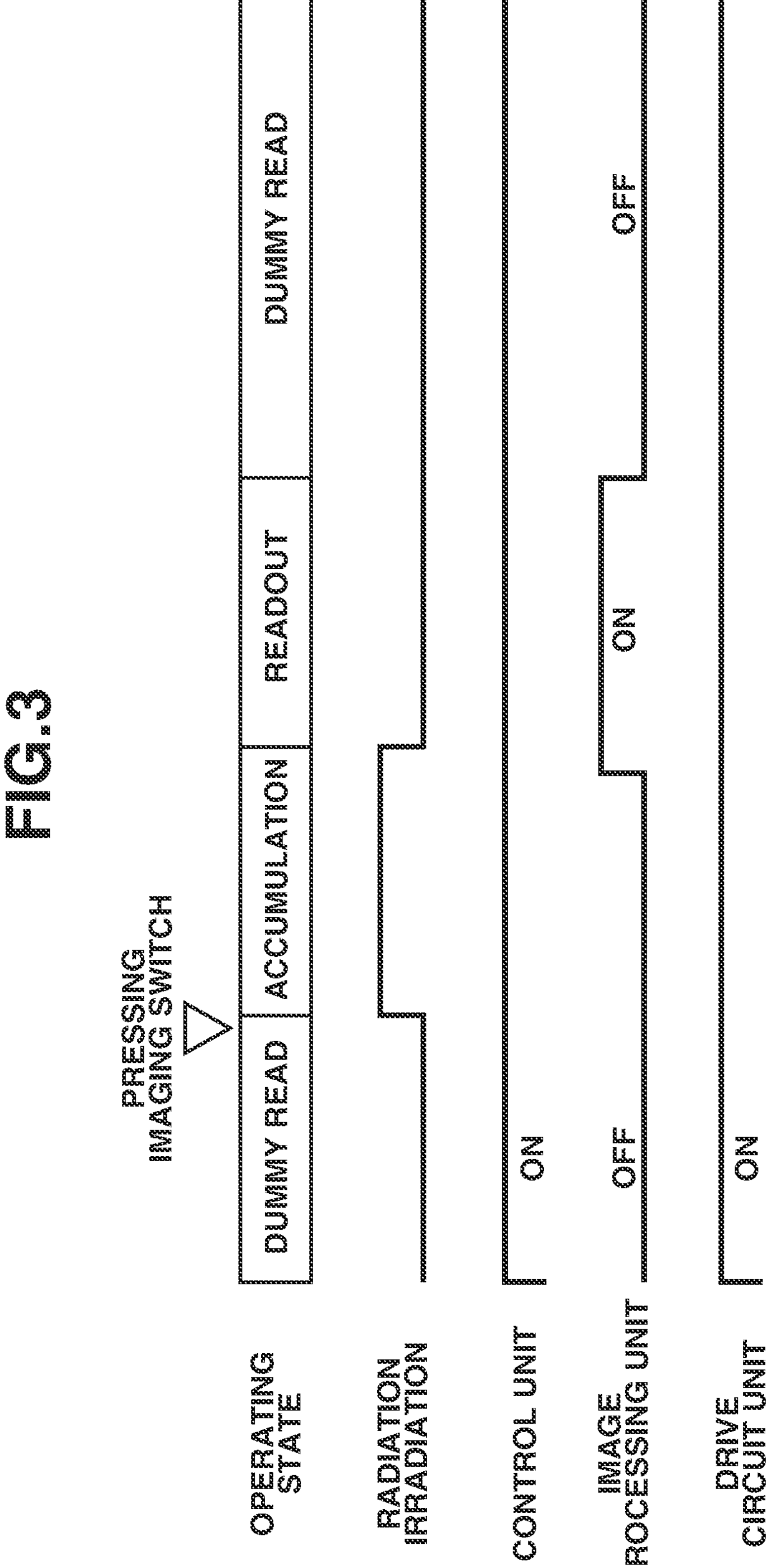
FIG. 3 is a timing chart illustrating power supply control in a case where an image processing unit according to the first exemplary embodiment is turned OFF immediately before a readout period.
Figure 4:
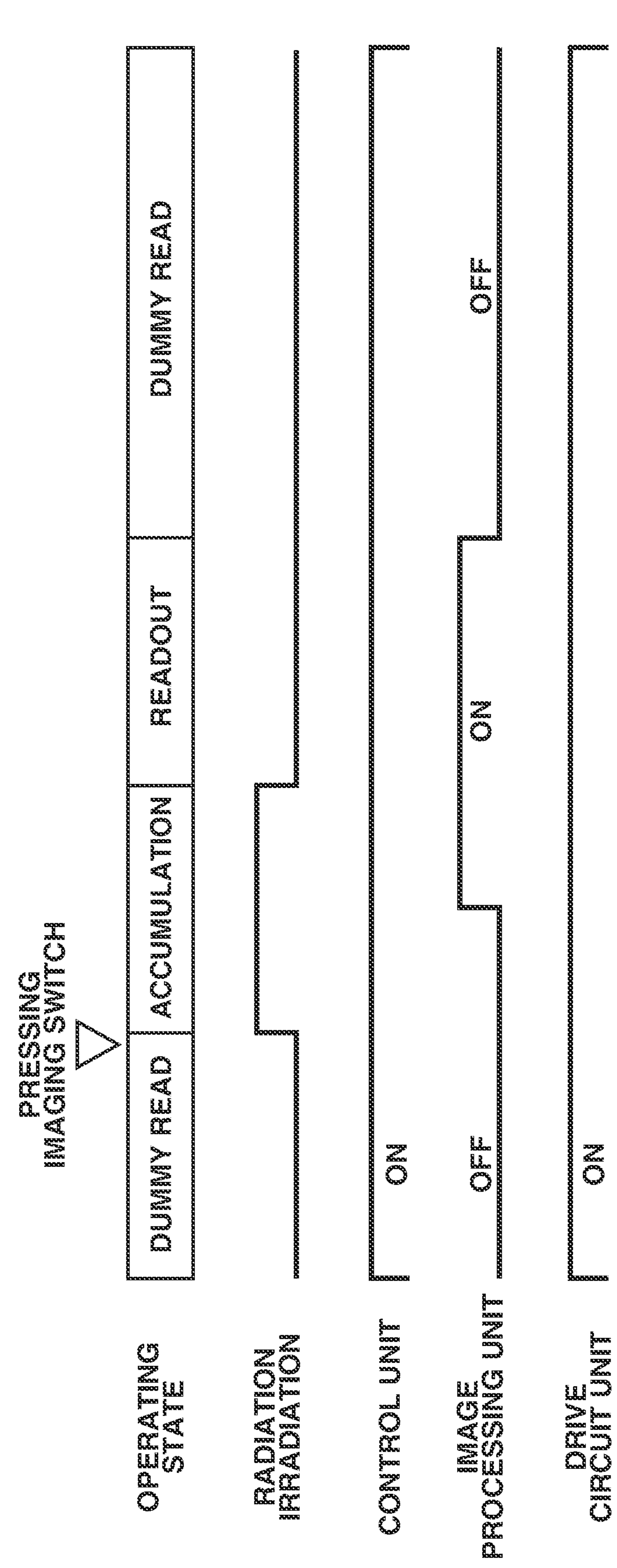
FIG. 4 is a timing chart illustrating power supply control in a case where the image processing unit according to the first exemplary embodiment is turned OFF during an accumulation period.
Figure 5:
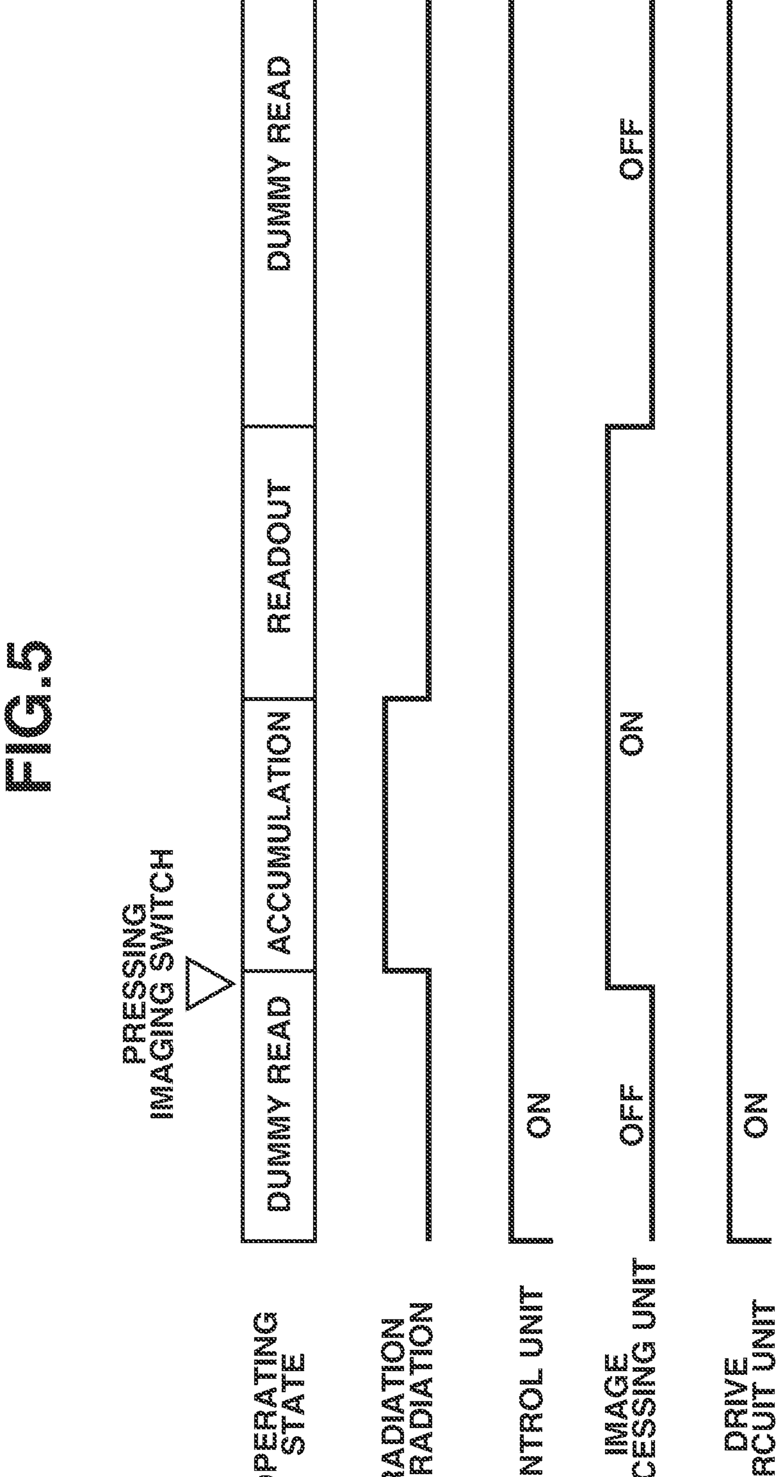
FIG. 5 is a timing chart illustrating power supply control in a case where the image processing unit according to the first exemplary embodiment is turned OFF immediately before the accumulation period.

Power supply control by the control unit 110 with respect to the image processing unit 109 will now be described. The control unit 110 controls the power supply based on a timing when the imaging switch 117 is pressed. In response to the imaging switch 117 being pressed, a radiation irradiation request is issued, and the radiation imaging apparatus 101 is switched from the imaging standby state to the imaging operation, so that the image processing unit 109 is activated at that timing. FIGS. 3 to 5 illustrate the timing at which the image processing unit 109 is activated.

FIG. 3 is a timing chart illustrating the power supply control with respect to the image processing unit 109 according to the present exemplary embodiment. The image processing unit 109 is turned ON immediately before a readout period and turned OFF at a timing when acquisition of the image data, image processing, and storing of the image data are completed. In other words, the image processing unit 109 is turned ON only during the readout period and turned OFF during the other periods. The drive circuit unit 111 is turned ON during an accumulation period, the readout period, and a dummy read period.

FIG. 4 is a timing chart in which the timing of turning ON the image processing unit 109 is changed to during charge accumulation from that in FIG. 3. In other words, the image processing unit 109 is also turned ON during at least part of the accumulation period, which is a period during which the pixel is irradiated with radiation. Accordingly, it is possible to reduce or prevent the occurrence of an artifact in a read image due to an influence of ground (GND) potential fluctuation caused by turning ON the image processing unit 109 which has been turned OFF.

FIG. 5 is a timing chart in which the timing of turning ON the image processing unit 109 is changed to immediately before the charge accumulation period from that in FIG. 3. In other words, the image processing unit 109 is turned OFF during the dummy read period in which the readout circuit reads out the charge accumulated in the pixel without irradiation with radiation and discards the readout charge.

The present disclosure can also be realized by executing the following processing. More specifically, a program for realizing one or more functions of the above-described exemplary embodiments is supplied to a system or an apparatus via a network or a storage medium and one or more processors of a computer of the system or the apparatus reads and executes the program. The present disclosure can also be realized by a circuit (for example, an application specific integrated circuit (ASIC)) that realizes one or more functions.

The program and a computer-readable storage medium storing the program are included in the present disclosure.

The above-described exemplary embodiments of the present disclosure are merely examples for implementing the present disclosure, so that the examples should not be construed restrictively limiting the technical scope of the present disclosure. In other words, the present disclosure also includes modifications and improvements made to the above-described exemplary embodiments of the present disclosure based on the common knowledge of those skilled in the art without departing from its technical idea or main features within its scope.

According to the present disclosure, it is possible to reduce power consumption of a radiation imaging apparatus.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-051694, filed Mar. 28, 2023, which is hereby incorporated by reference herein in its entirety.

What is claimed is:

1. A radiation imaging apparatus comprising:

a pixel configured to generate a charge based on radiation;

a readout circuit configured to read out the charge from the pixel;

a drive unit configured to drive the readout circuit;

an image processing unit configured to read out the charge from the readout circuit and generate an image based on the charge;

a power supply unit configured to supply power to the drive unit and the image processing unit; and a control unit configured to control the drive unit, the image processing unit, and the power supply unit, wherein the control unit performs first control to cause the power supply unit to supply power to the drive unit and the image processing unit and second control to cause the power supply unit to supply power to the drive unit and not to supply power to the image processing unit, and wherein the first control is performed subsequent to the second control.

2. The radiation imaging apparatus according to claim 1, wherein the control unit performs the first control in a readout period in which the readout circuit reads out a charge accumulated by irradiation of the pixel with radiation.

3. The radiation imaging apparatus according to claim 2, wherein the control unit performs the first control in at least part of a period during which the pixel is irradiated with radiation.

4. The radiation imaging apparatus according to claim 1, wherein the control unit performs the second control in a dummy read period in which the readout circuit reads out a charge accumulated in the pixel without irradiation with radiation and discards the readout charge.

5. The radiation imaging apparatus according to claim 1, wherein power consumption of the image processing unit is greater than power consumption of the drive unit.

6. The radiation imaging apparatus according to claim 1, wherein the power supply unit is a battery.

7. A radiation imaging system comprising:

a radiation imaging apparatus comprising:

a pixel configured to generate a charge based on radiation;

a readout circuit configured to read out the charge from the pixel;

a drive unit configured to drive the readout circuit;

an image processing unit configured to read out the charge from the readout circuit and generate an image based on the charge;

a power supply unit configured to supply power to the drive unit and the image processing unit; and a control unit configured to control the drive unit, the image processing unit, and the power supply unit, wherein the control unit performs first control to cause the power supply unit to supply power to the drive unit and the image processing unit and second control to cause the power supply unit to supply power to the drive unit and not to supply power to the image processing unit, and wherein the first control is performed subsequent to the second control; and a control apparatus configured to process an image captured by the radiation imaging apparatus.

* * * * *